(12) United States Patent
Vick et al.

(10) Patent No.: US 8,127,743 B2
(45) Date of Patent: Mar. 6, 2012

(54) BRAKE FOR A HEDGE CLIPPER

(75) Inventors: Christian Vick, Winsen/Luhe (DE);
Mark Jesse, Hamburg (DE)

(73) Assignee: DOLMAR GmbH (DE)

( * ) Notice: Subject to any disclaimer, the term of this patent is extended or adjusted under 35 U.S.C. 154(b) by 625 days.

(21) Appl. No.: 11/720,558

(22) PCT Filed: Nov. 28, 2005

(86) PCT No.: PCT/DE2005/002146
§ 371 (c)(1),
(2), (4) Date: Mar. 17, 2009

(87) PCT Pub. No.: WO2006/060988
PCT Pub. Date: Jun. 15, 2006

(65) Prior Publication Data
US 2009/0205304 A1 Aug. 20, 2009

(30) Foreign Application Priority Data

Dec. 7, 2004 (DE) .................... 20 2004 018 885 U

(51) Int. Cl.
*F02D 7/00* (2006.01)
*G05G 5/06* (2006.01)
*B23D 57/00* (2006.01)

(52) U.S. Cl. ............. 123/400; 123/398; 30/382; 74/529

(58) Field of Classification Search ................. 123/319, 123/398, 400, 185.4, 179.18; 56/11.3, 11.4, 56/11.7, 10.8, 239–243; 30/21, 381–386; 188/177 W, 77 W; 74/501, 502.523, 528, 74/529

See application file for complete search history.

(56) References Cited

U.S. PATENT DOCUMENTS

| 4,683,660 | A | | 8/1987 | Schurr |
| 4,753,012 | A | | 6/1988 | Schurr |
| 4,976,093 | A | | 12/1990 | Everts |
| 5,664,543 | A | * | 9/1997 | Taomo et al. .................. 123/400 |
| 5,718,052 | A | * | 2/1998 | Taomo et al. .................... 30/276 |
| 6,021,757 | A | * | 2/2000 | Nagashima .................... 123/400 |
| 6,055,797 | A | * | 5/2000 | Nagashima .................... 56/11.3 |
| 6,056,668 | A | * | 5/2000 | Nagashima .................... 477/207 |
| 6,640,444 | B1 | * | 11/2003 | Harada et al. ................. 30/277.4 |
| 7,490,587 | B2 | * | 2/2009 | Rosskamp et al. ............ 123/319 |
| 2004/0200651 | A1 | * | 10/2004 | West ............................. 180/181 |
| 2005/0257379 | A1 | * | 11/2005 | Berti et al. ....................... 30/276 |

FOREIGN PATENT DOCUMENTS

| DE | 34 19 152 A1 | 11/1985 |
| DE | 34 30 840 A1 | 3/1986 |
| DE | 36 39 650 A1 | 6/1988 |
| DE | 39 32 137 A1 | 4/1991 |
| DE | 198 21 303 A1 | 11/1998 |

(Continued)

*Primary Examiner* — Willis Wolfe, Jr.
*Assistant Examiner* — Johnny Hoang
(74) *Attorney, Agent, or Firm* — Kelly & Kelley, LLP

(57) ABSTRACT

A work implement in the nature of a drive for a tool includes a starting and/or switching-off braking device for the tool. A brake button is provided which can be externally actuated by a user, with which a starting and/or switching-off brake can be released. A device is also provided which can change the rotational speed of the drive, the device having a throttle button capable of being actuated by the user from outside. The brake button and the throttle button are arranged on a handle so that they can be contacted simultaneously by the hand of a user, where the throttle button can be actuated when the starting and/or switching-off brake is applied.

8 Claims, 6 Drawing Sheets

FOREIGN PATENT DOCUMENTS

Figure 1:
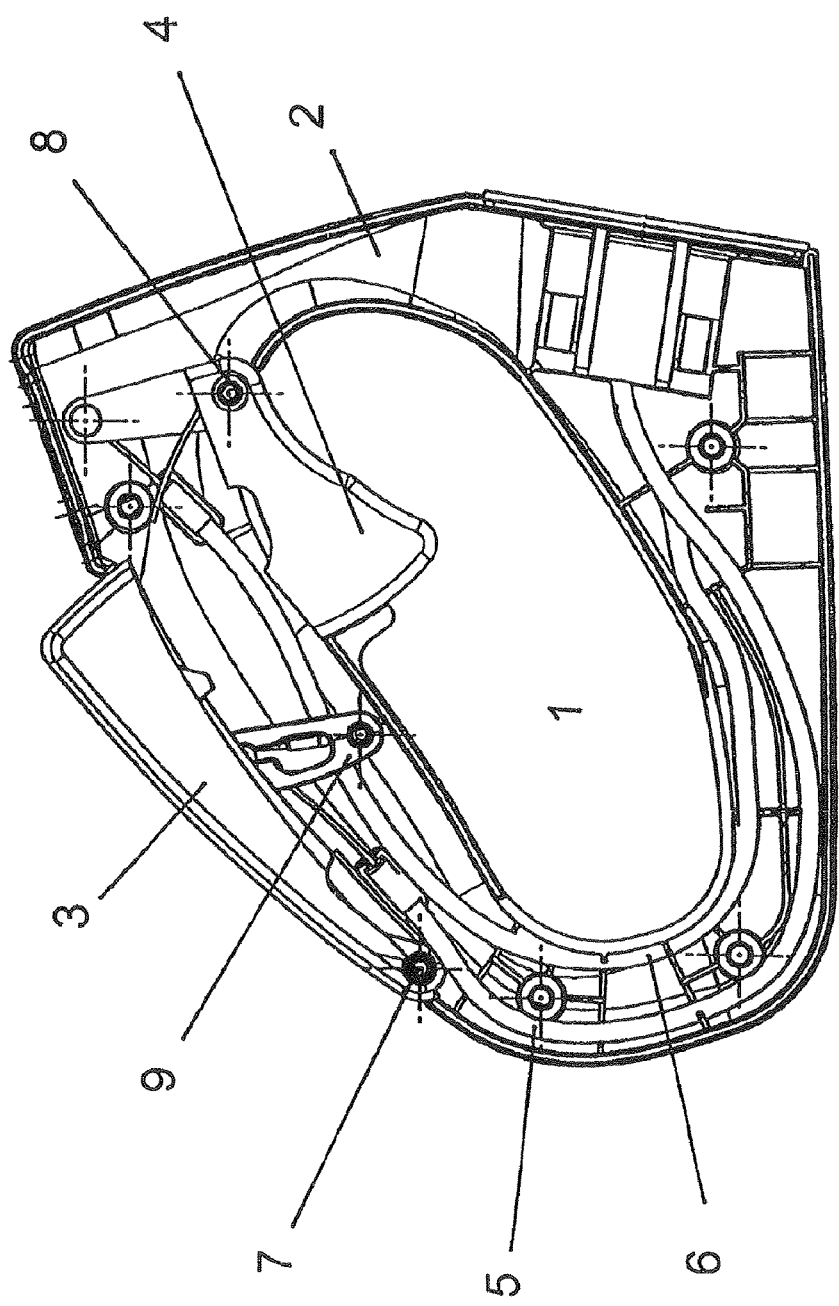

| | | |
|---|---|---|
| DE | 198 52 012 A1 | 5/1999 |
| DE | 198 08 118 A1 | 9/1999 |
| DE | 202004018885 U1 | 5/2006 |
| EP | 0 968 641 B1 | 9/2003 |

* cited by examiner

BRAKE FOR A HEDGE CLIPPER

The invention relates to a work implement according to the preamble of claim 1.

Work implements in the form of hedge clippers, angle grinders, edge cutters or motorised chain saws are generally well known. In the case of work implements driven by internal combustion engines, there is the problem that when starting or switching off the device, the tools can start prematurely or after-run and may injure the user. In order to prevent this starting, a starting brake is usually provided which locks the tools during the starting process.

DE 36 39 650 A1 discloses a starting brake which can be actuated by a locking button. When the locking button projects from the handle, the starting brake is applied whilst the starting brake is released by depressing the locking button in the handle. The throttle lever is operatively related to the locking button so that the throttle lever can only be actuated after depressing the locking button. A disadvantage here is that the coupling mechanism between the locking button and the throttle lever is susceptible to wear and that transfer to an advantageous half-throttled position for warm starting of the work implement must be made by adjusting a separate lever on the housing.

DE 198 21 697 C2 discloses a braking device which relates to an auxiliary throttle lever to be actuated separately from the throttle lever. A disadvantage here is that a half-throttle switch is not integrated in the handle mechanism.

It is the object of the present invention to provide a work implement with a starting and/or switching-off brake. A particular object of the invention is to provide a work implement which allows safe starting in a manner which is easy to handle.

The object is achieved in a work implement specified initially whereby the throttle button can be actuated when the starting and/or switching-off brake is applied. In this case, the starting and/or switching-off brake is preferably applied when the brake button is not actuated. Locking mechanics whereby the throttle button is locked by the non-actuated brake button and whereby the throttle button is released by actuating the brake button can advantageously be dispensed with here. The invention can be applied to various types of work implements such as hedge clippers, chain saws, lawn edge trimmers, angle grinders etc.

At best, the brake button and the throttle button can be actuated substantially independently of one another. Coupling mechanics between the two buttons can be dispensed with so that the work implement can be produced more cheaply and is more free from wear.

In a preferred embodiment of the invention, the throttle button and the brake button can be actuated, most preferably continuously, each between a rest position and a maximum operating position. In this case, one button can be actuated freely between its rest position and its operating position in any position of the other button. In a maximum operating position of the throttle button, the rotational speed of the drive is highest and in a maximum operating position of the brake button, the starting and/or switching off brake is completely released.

The brake button advantageously controls the starting and/or switching off brake via a first connecting means and the throttle button controls the drive of the work implement via a second connecting means which is independent thereof. Advantageously, the first connecting means comprises a brake cable assembly and the second connecting means comprises a throttle cable assembly. However, formations of the connecting means as rods, control cables or the like are also feasible. In particular, said cable assemblies can be produced cheaply.

Advantageously, the brake button acts on a brake lever which changes its relative position to the handle by actuating the brake button and thereby effects a tightening of the first connecting means as a result of the relative change in position. For this purpose, the brake button can have a guide for one end of the brake lever on an inner side facing the handle, the other end therefore being connected to the handle in an articulated manner. One end of the lever preferably comprises a roller whereby the end can be rolled along in the guide. The first connecting means advantageously goes approximately centrally from the brake lever. This embodiment can be produced particularly cost-effectively and durably by slight modifications of known safety mechanisms between the brake button and throttle button.

The throttle button and the brake button are preferably arranged so that they can pivot about relevant axes. The brake button can be pivotable about a brake button axis arranged at its end on the inside relative to the user. In another preferred embodiment, a throttle lever goes from the throttle button to the inside of the handle and is firmly connected thereto. In this case, the throttle lever and the throttle button can have a common pivot point in the form of a throttle button axis. The second connecting means is then most preferably connected to the end of the throttle lever at a distance from the throttle button.

The brake button and throttle button can be arranged on a pistol handle with the connecting means running in its interior so that they are protected.

The brake button is advantageously arranged on a side of the handle facing the user and the throttle button is provided on a side of the handle facing away from the user. During operation the brake button can be actuated by the ball of the thumb of the user's hand and the throttle button can be actuated by the fingers of the user's hand.

Figure 2:
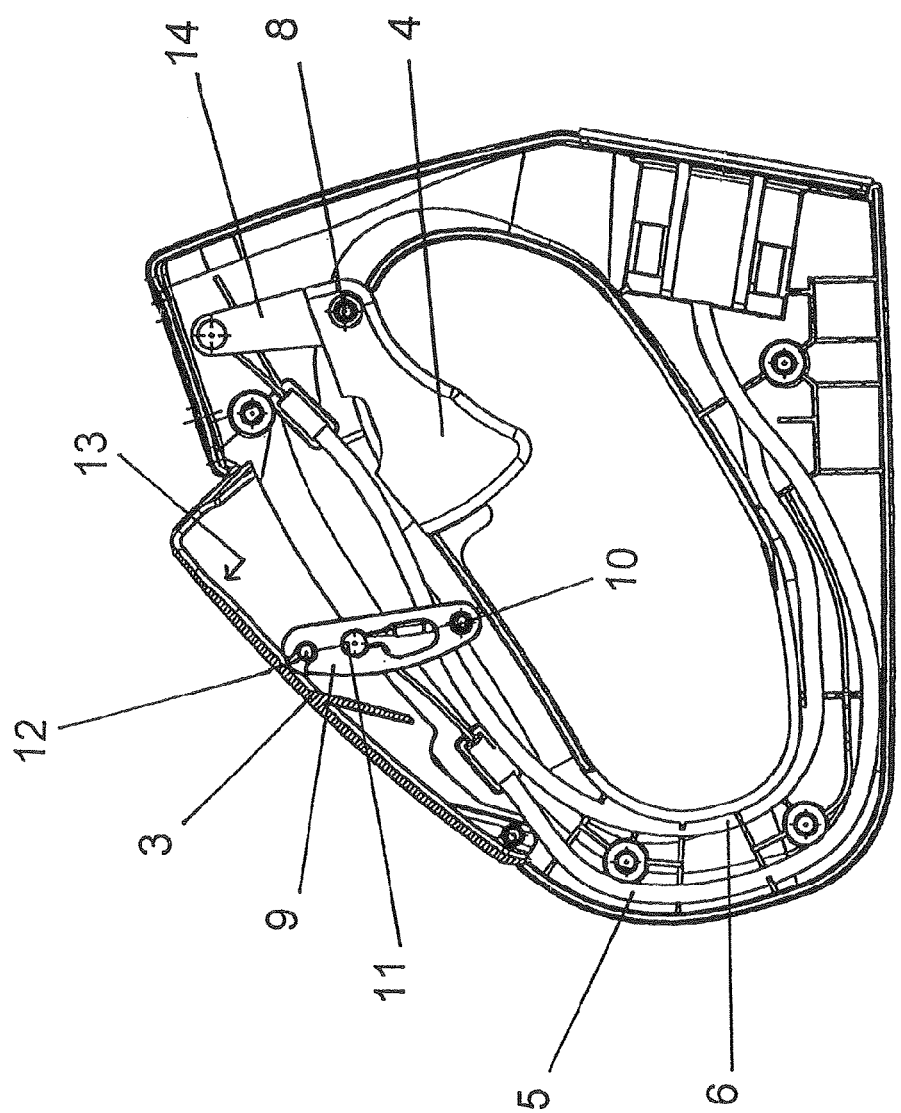
Figure 3:
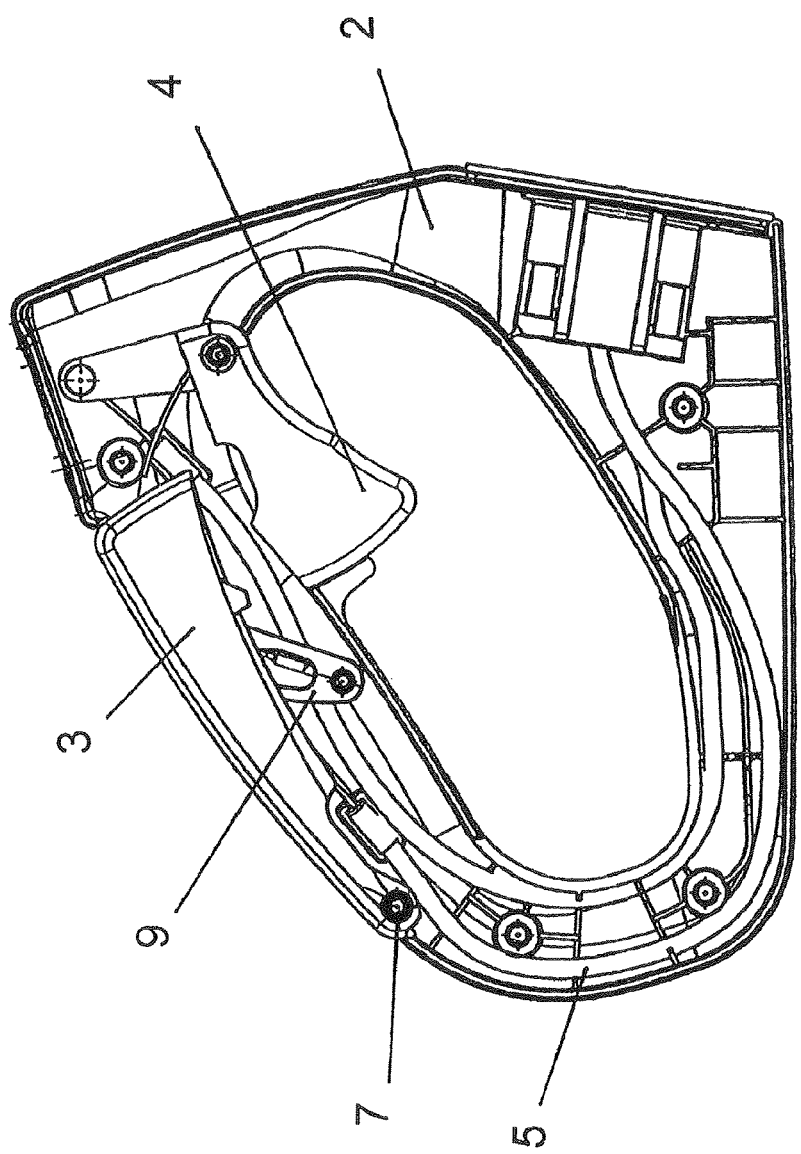
Figure 4:
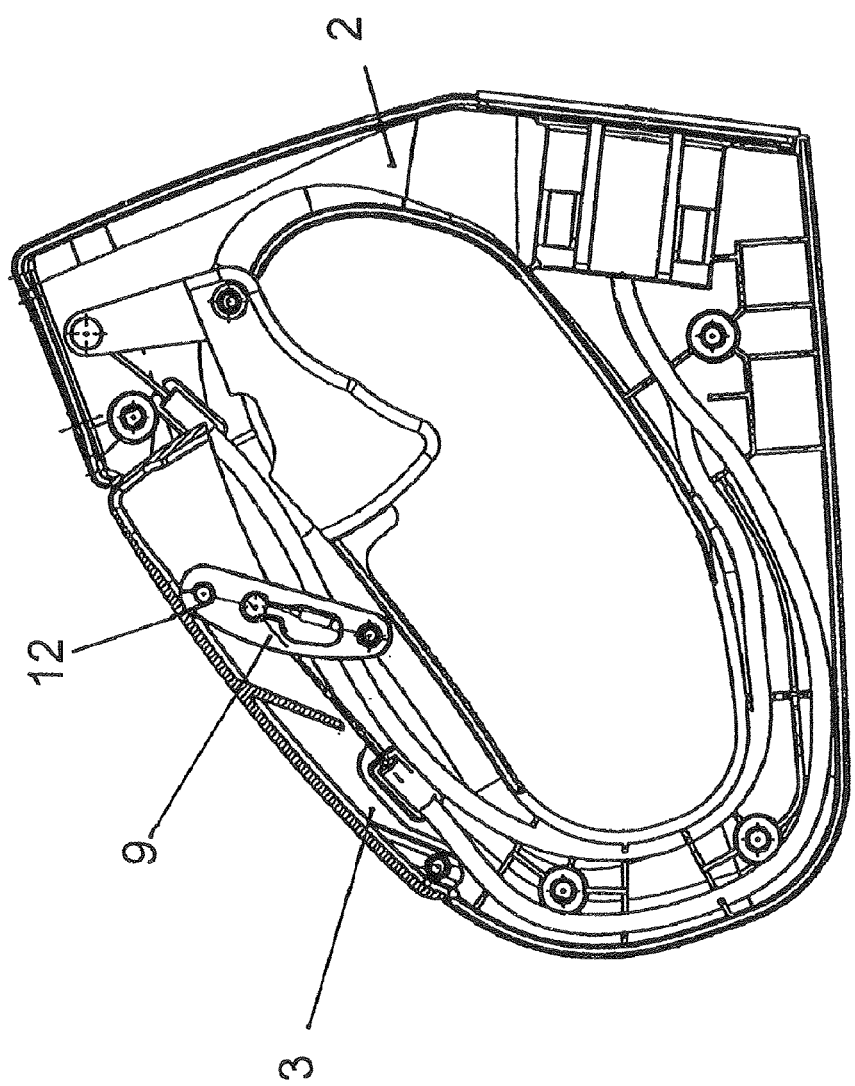
Figure 5:
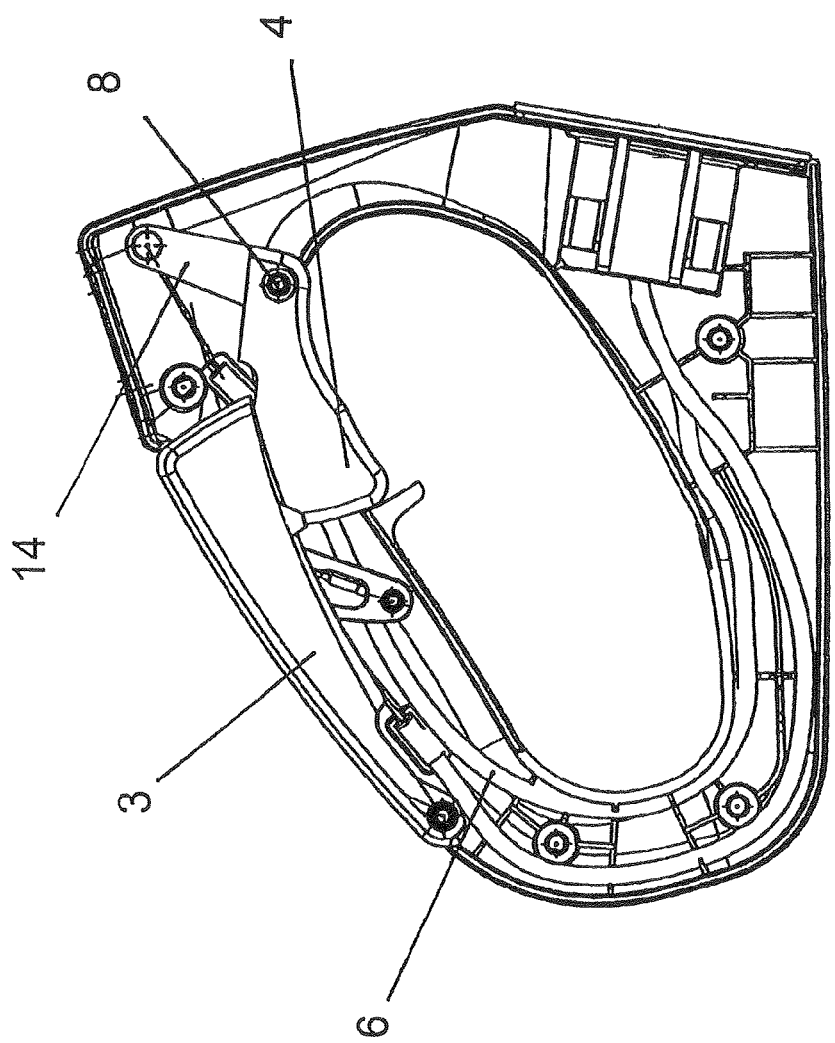
Figure 6:
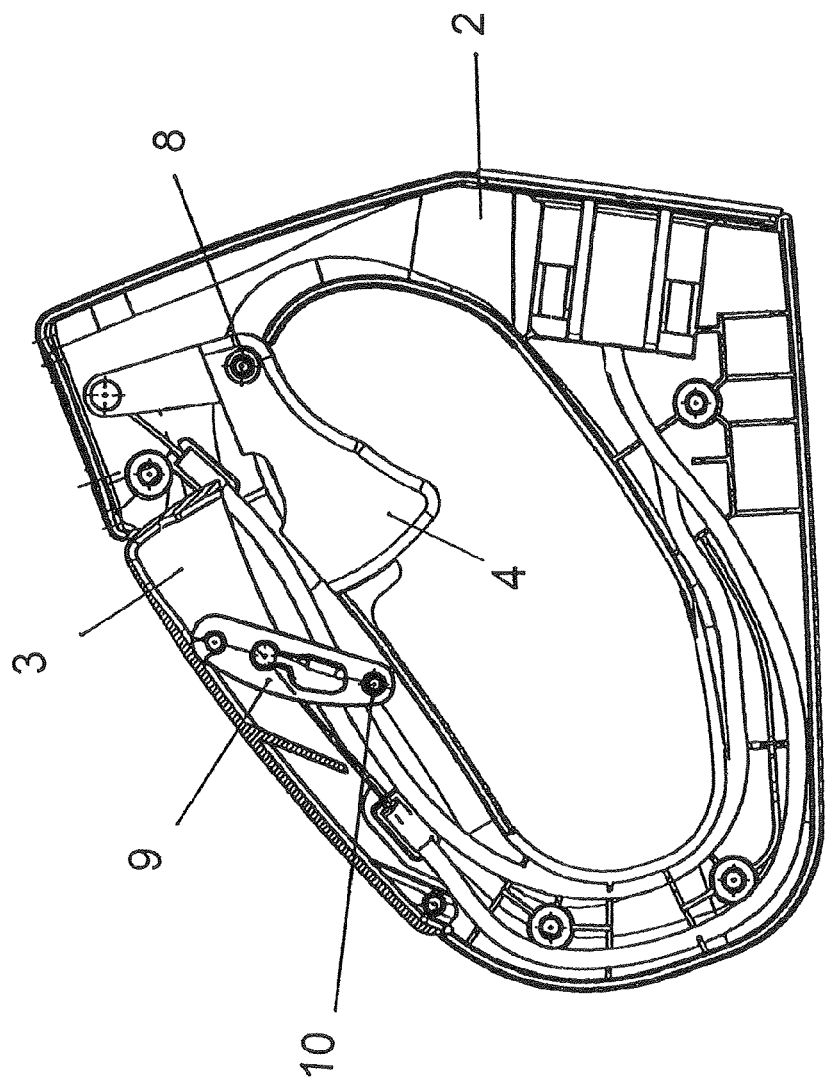

The invention is now described with reference to an exemplary embodiment in nine figures. In the figures:

FIG. 1 is a side view of a brake button in the rest position and a throttle button in the rest position, FIG. 2 is a sectional view in FIG. 1, FIG. 3 is a side view with actuated brake button and throttle button in the rest position, FIG. 4 is a sectional view in FIG. 3, FIG. 5 is a side view with actuated brake button and actuated throttle button, FIG. 6 is a sectional view in FIG. 5.

FIG. 1 shows a pistol handle 2 surrounding a hand hole 1, comprising a brake button 3 and a throttle button 4. The pistol handle 2 can be attached to the end of a hedge clipper (not shown) on the user's side.

In FIG. 1 a drive and a cutting tool of the hedge clipper would be arranged on the right of the pistol handle 2. The brake button 3 is connected to a brake cable assembly 5 which runs around somewhat more than half the hand hole 1 in the interior of the pistol handle 2 starting from the brake button 3. The throttle button 4 is connected to a throttle cable assembly 6 which runs around somewhat more than three quarters of the hand hole 1.

The brake button 3 can pivot about a brake button axis 7 arranged at its end on the user side and the throttle button 4 can pivot about a throttle button axis 8 arranged at its end on the drive side. Pressure points for actuating the brake button 3 and the throttle button 4 by means of the ball of the thumb or the fingers of the same hand of the user lie on a connecting line which is aligned substantially perpendicularly to the longitudinal direction of the upper user-side section of the pistol handle 2.

FIG. 2 shows the connection between the brake cable assembly 5 and the brake button 3 in cross-section which exposes the view of a brake lever 9 arranged partly inside the brake button 3. One end of the brake cable 5 is connected to a central section of the brake lever 9 by means of an articulated connection 11. At its end facing the brake button 3 the brake lever 8 has a roller 12. One inner side of the brake button 3 is configured as a guide 13 for the roller 12. In a brake button rest position, the roller 12 is positioned in a central section of the brake button 3. By pressing the brake button 3, the brake lever in FIG. 2 pivots in the clockwise direction about a brake lever axis 10 and the brake cable 5 is tightened and a starting brake (not shown) is unlocked.

The throttle button 4 is firmly connected to a throttle lever 14. The throttle button 4 and throttle lever 14 are pivotally mounted about the same throttle button axis 8. One end of the throttle button axis 8 at a distance from the throttle button 4 is connected to an end of the throttle cable assembly 6. As a result of actuating the throttle button 4, the throttle cable assembly 6 is pulled and a throttle valve (not shown) is turned into an open position. The rotational speed of the drive is thus increased.

FIG. 3 shows the brake button 3 in the maximum brake button operating position whilst the throttle button 4 is in the throttle button rest position. The position corresponding to FIG. 3 is shown in cross-section in FIG. 4. Compared to the rest position of the brake button 3 in FIGS. 1 and 2, the brake lever 9 is pivoted about the brake lever axis 7 on the drive side of the pistol handle 2, thus tightening the brake cable 5. In the brake button rest position shown in FIGS. 1 and 2 the starting brake of the hedge clipper is applied. The shears of the hedge clipper thus cannot start running in the rest position. The brake cable assembly 5 of the brake lever 3 for example, triggers a brake band as part of the starting brake which is laid around a brake drum connected to the drive. The operating position of the brake button 3 can be varied continuously between the rest position of the operating button and the maximum position of the operating button.

The position of the brake lever 9 in the actuated brake button 3 can be seen in FIG. 4. The roller 12 abuts against the inner side of the brake button 12 in a region facing the drive. In this case, an angle between a longitudinal axis of the brake lever 9 and a longitudinal axis of the handle region of the pistol handle 2 in the operating position of the brake lever 9 is smaller than in the rest position.

In FIGS. 5 and 6 the throttle button 4 is actuated in addition to the brake button 3. In this case, the throttle button 4 is located in the maximum throttle button operating position. The throttle button 4 can adopt any operating position between the throttle button rest position and the maximum operating position of the throttle button and can thus continuously vary the rotational speed of the drive. The throttle cable assembly 6 leaving the throttle button 4 is guided along the brake cable assembly 4 inside the pistol handle 2 and is thus initially also guided away from the drive before being guided back towards this again in an arc shape. The throttle button 4 and the throttle lever 14 are pivoted about the throttle button axis 8 in the clockwise direction. Whilst the throttle button 4 is pulled towards the brake button 1, the throttle lever 9 goes over from the rest position into the operating position in the clockwise direction (FIG. 5 and FIG. 6). The throttle button 4 is operated by the user with the fingers of his hand and the brake button 3 is operated simultaneously with the ball of the thumb.

The invention claimed is:

1. A work implement in the nature of a drive for a tool and a starting and/or switching-off braking device for the tool, comprising:
   a brake button which can be externally actuated by a user, with which the starting and/or switching-off brake can be released;
   a device for changing the rotational speed of the drive, the device having a throttle button capable of being externally actuated by the user;
   wherein the brake button and the throttle button are arranged on a handle so that they can be contacted simultaneously by the same hand of a user;
   characterised in that the throttle button can be actuated when the starting and/or switching-off brake is applied, so that the throttle button and the brake button can be actuated independently of one another, and so that the brake button can be actuated continuously between a brake button rest position and a maximum brake button operating position, and in any position of the brake button the throttle button can be actuated continuously between a throttle button rest position and a maximum throttle button operating position;
   whereas the throttle button is in communication with the drive via a first connecting means, which is performed as a throttle cable assembly, and the brake button is in communication with the starting or switching-off brake via a second connecting means, which is performed as a brake cable assembly.

2. The work implement according to claim 1, characterised in that the starting and/or switching-off brake is applied when the brake button is not actuated.

3. The work implement according to claim 1, characterised in that the brake button has a guide for one end of the brake lever on an inner side facing the handle, the other end therefore being connected to the handle in an articulated manner.

4. The work implement according to claim 3, characterised in that one end of the brake lever has a roller whereby one end can be rolled along in the guide when the brake button is actuated.

5. The work implement according to claim 4, characterised in that the first connecting means is connected approximately centrally to the brake lever.

6. The work implement according to claim 1, characterised in that a throttle lever goes from the throttle button to the inside of the handle and the throttle lever is firmly connected to the throttle button and the throttle lever and the throttle button have a common throttle button axis as the pivot point and the second connecting means is connected to the throttle lever at a distance from the throttle button.

7. The work implement according to claim 1, characterised in that the brake button is arranged on a side of the handle facing the user and the throttle button is arranged on a side of the handle facing away from the user and the brake button can be actuated by the ball of the thumb of the user's hand and the throttle button can be actuated by the fingers of the user's hand.

8. The work implement according to claim 1, characterized in that the brake button acts on a brake lever which changes its relative position to the handle by actuation of the brake button and thereby tightens a first connecting means.

* * * * *